United States Patent
Ma et al.

(10) Patent No.: US 7,260,457 B2
(45) Date of Patent: Aug. 21, 2007

(54) SECONDARY POWER SUPPLY FOR TELEMATICS TERMINAL

(75) Inventors: Jin-Suk Ma, Daeleon (KR); Sun-Ja Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/301,694

(22) Filed: Dec. 12, 2005

(65) Prior Publication Data

US 2006/0173595 A1    Aug. 3, 2006

(30) Foreign Application Priority Data

Dec. 13, 2004   (KR) ................. 10-2004-0105130

(51) Int. Cl.
*G06F 7/00* (2006.01)

(52) U.S. Cl. .................. 701/36; 180/2.1; 180/443; 204/196.26; 204/229.8; 204/230.2; 222/648

(58) Field of Classification Search ............ 701/1–302; 363/1–148; 180/2.1, 443; 204/196.26, 229.8, 204/230.2; 222/648; 505/869; 340/426.34
See application file for complete search history.

(56) References Cited

U.S. PATENT DOCUMENTS

| | | | | |
|---|---|---|---|---|
| 5,565,751 A | * | 10/1996 | Greiser .................. 318/801 |
| 5,627,414 A | * | 5/1997 | Brown et al. ............ 205/726 |
| 5,708,307 A | * | 1/1998 | Iijima et al. ............ 307/10.5 |
| 5,831,841 A | * | 11/1998 | Nishino .................. 363/37 |
| 6,107,698 A | * | 8/2000 | Ochiai et al. ............ 307/43 |
| 6,332,506 B1 | * | 12/2001 | Kifuku .................. 180/443 |
| 6,497,303 B1 | * | 12/2002 | Nishimura et al. ........ 180/446 |
| 6,591,176 B1 | | 7/2003 | Perry et al. |
| 7,062,379 B2 | * | 6/2006 | Videtich ................ 701/210 |
| 7,078,829 B2 | * | 7/2006 | Hunninghaus et al. ..... 307/10.6 |
| 7,086,495 B2 | * | 8/2006 | Tsutsui ................. 180/443 |
| 7,098,549 B2 | * | 8/2006 | Asakage et al. .......... 290/40 R |
| 7,123,164 B2 | * | 10/2006 | Zoladek et al. ......... 340/870.07 |
| 2005/0029869 A1 | * | 2/2005 | Teran et al. ............ 307/10.1 |
| 2006/0069412 A1 | * | 3/2006 | Ginggen et al. .......... 607/33 |
| 2006/0208693 A1 | * | 9/2006 | Emori et al. ............ 320/106 |

FOREIGN PATENT DOCUMENTS

| | | |
|---|---|---|
| JP | 2002-293205 | 10/2002 |
| KR | 10-2003-0089769 | 11/2003 |
| KR | 10-2004-0073749 | 8/2004 |

* cited by examiner

*Primary Examiner*—Thomas Black
*Assistant Examiner*—Jorge O. Peche
(74) *Attorney, Agent, or Firm*—Blakely Sokoloff Taylor & Zafman

(57) ABSTRACT

The present invention provides a secondary power supply for the telematics terminal. A secondary power supply for a telematics terminal including. a power control unit for controlling a power supply based on a power control signal of the telematics terminal and/or a start-up key signal; a telematics control unit which is operated by power supplied from a secondary power supply unit under the control of the power control unit and controls each of components inside the telematics terminal; the secondary power supply unit for supplying the power to the telematics control unit; and a rectifying unit for rectifying power from a main power supply unit one more time and protecting the components from a reverse voltage by opening the connection of the main power supply unit and the secondary power supply unit when a voltage level of the secondary power supply unit is higher than that of the main power supply unit.

2 Claims, 4 Drawing Sheets

SECONDARY POWER SUPPLY FOR TELEMATICS TERMINAL

FIELD OF THE INVENTION

The present invention relates to a secondary power supply for a telematics terminal; and, more particularly, to a secondary power supply capable of protecting hardware inside the telematics terminal, supplying stable power into the telematics terminal and reducing a sensible booting delay time by controlling power supply to the telematics terminal.

DESCRIPTION OF RELATED ART

Generally, a term "telematics" is a compound word of "telecommunication" and "informatics". The telematics is a concept including a service, a terminal and an operating system (OS) which transmits various information to driver and passengers and receives various information from the driver and the passengers during vehicles running by connecting the vehicles and a service center using a wireless communication technique and a global positioning system (GPS). That is, the telematics commonly means information infrastructure and service capable of supporting multiple media communication by connecting digital information such as an image, a speech, a motion picture and a video to a wired/wireless network.

A computing technique which is used at not only home and office but also in the vehicles is rapidly developed with the generalization of personal computers (PCs) and the popularization of high-speed wireless internet. As a result, it is possible to implement data communication in the vehicle through the wireless network such as code division multiple access (CDMA) and a telematics terminal having integrated functions such as navigation and audio/video is rapidly developed and distributed.

That is, as activities for information communication and demands are increased, a request for intelligence activities such as wireless internet, e-commerce, entertainment using CDMA and portable internet in the vehicles is increased. For supporting the request, in the vehicle, the telematics terminal having environment similar to that of the PC at home and its relating services are developed. Major services of the telematics terminal are various from initial telematics services such as automatic accident sensing and emergency order, vehicle burglar sensing and chasing, navigation and location guiding to a multimedia service through internet.

Recently, equipments for telematics of the vehicle are developed rapidly in domestic and foreign. The telematics terminal is able to access, acquire and share a variety of information by using a CDMA 1x-EVDO network for accessing a wideband wireless network in the vehicle. Additionally, the telematics terminal can regenerate MPEGx data by using an embedded function. Moreover, the telematics terminal performs a GPS navigation function by using an embedded map data or data transmitted online.

The telematics terminal and its services are prepared in not only Hyundai Motors Company, Hyundai Mobis Company, LG electronics cooperation, Samsung electronics, and ETRI but also KTF, SK telecom and so on. The telematics terminal or other terminals having a similar concept to the telematics terminal will be a basic embedded system for the vehicles in domestic and foreign.

FIG. 1 shows an interior of a vehicle having a telematics terminal, e.g., a MOZEN of Hyundai Motors Company, installed therein.

The MOZEN is currently installed in cars and recreational vehicles (RV) for the before market. The MOZEN provides basic services such as SOS, burglar chasing, automatic reporting of airbag unfolding, remote door open, burglar alarm, navigation, traffic information, secretary service, wireless internet and so on.

Meanwhile, Hyundai Mobis Company releases a telematics terminal "eXride" for the after market. The eXride provides services such as CD, radio, MP3, navigation, wireless internet, e-mail access, remote door open, vehicle examination, game and so on.

Generally, the telematics terminal can be divided into a hardware part and a software part.

The hardware part constructing the telematics terminal can be analyzed as follows.

The telematics terminal requires high-performance specification hardware to provide a variety of application services. In view of power computing, various vehicle systems are constructed by using a processor of "SuperH" of Hitachi Cooperation or "PowerPC" of Motorola Company. In addition, the telematics terminal requires not only high-speed performance CPU but also a 2D graphic accelerator, a wireless network IO such as CDAM, a high-speed multimedia serial bus such as an intelligent transportation system data bus (IDB1394) and a media oriented systems transfer (MOST), and an interface of control bus such as a control area network (CAN). That is, the telematics terminal requires much high performance specification than that of a conventional system for only navigation. Actually, an "iDrive" system produced by BMW Cooperation uses most of the high-performance specifications described above.

That is, considering fundamental service specifications and performance requirements of contents and applications to be developed of the telematics terminal, CPU operating in a GHz clock may be used sooner or later. A representative processor "Xscale" for an information terminal using an "ARM" core or a processor of "PowerPC" series also require the above performance and the study for GHz operation is in progress. Therefore, telematics terminals employing the above high performance processors will emerge sooner or later.

In the meantime, the software part constructing the telematics terminal can be analyzed as follows.

In case of software, an operating system used in the telematics terminal and various middleware, multimedia library and application software based on the operating system can be considered. Operating systems such as WinCE, QNX, VxWorks carinfotainment and embedded Linux are used, studied or under development home and abroad.

As described above, various service contents may be embedded in the telematics terminal, wherein, in order to use the various service contents, a high performance operating system, a plurality of device drivers and various middleware following international standards should be embedded in the telematics terminal.

FIG. 2 shows a software stack of the telematics terminal.

As shown in FIG. 2, an embedded library for various multimedia and a plurality of middleware such as a Java Virtual Machine (JVM), an Open Services Gateway Initiative (OSGi) and an Automotive Multimedia Interface Collaboration (AMI-C) should be embedded in the telematics terminal.

However, there occurs a problem that a long booting time is needed after a system powered on in the telematics terminal by embedding the plurality of middleware. Herein, the long booting time is only for initializing the plurality of middleware. Furthermore, a time for initializing an operating system should be counted. Therefore, generally minimum 30 seconds to maximum more than 3 minutes is required in initializing the telematics terminal.

As the booting time of the telematics terminal is longer, a user feels inconvenience. When worst, desired services cannot be provided on time to the user. In addition, an important service such as an emergency service cannot be worked. That is, the long booting time of the telematics terminal can be a big problem.

Meanwhile, the telematics terminal is operated by a battery of the vehicle because the telematics terminal is used in the vehicle. Since, however, the battery of the vehicle outputs irregular voltages, in case of a manual transmissions vehicle, sudden voltage drop may occur by a sudden stop of the vehicle due to a habit of a driver. In this case, devices of the telematics terminal may got severe shocks and may be burned out.

In Japan, a GPS navigation system embedding a hard disk is popularized and, thus, it is predicted that using the hard disk in the vehicle will be popularized before long. According, the hard disk may be embedded in the telematics terminal near future. However, the hard disk can easily burned out by irregular power-off and the operating system uses hardware complexly in the telematics terminal. Therefore, if the system is down due to the irregular power voltage during a flash memory storing a present state, there is a probability that devices of the telematics terminal do not work well in the next booting. Therefore, the irregular voltage supplied to the telematics terminal should be solved.

Several techniques for reducing the booting time are now under study. Hereinafter, contents, advantages and disadvantages of the several techniques will be described.

First, a microprocessor having a GHz computing power, i.e., a GHz microprocessor, and peripheral chipsets can be used for reducing the booting time. A personal computer having the GHz microprocessor spends a shorter booting time than a conventional personal computer. Although this method totally depends on the development of a hardware technology, the adoption of the GHz microprocessor can reduce the booting time certainly.

However, a problem is whether the GHz microprocessor used in the PC can be embedded in the telematics terminal or not. In order to adopt the GHz microprocessor in the vehicle, there are several problems to be solved, e.g., power consumption, heating, noise and reliability. Therefore, the adoption of the GHz microprocessor in the vehicle is still far off.

Second, the software stack illustrated in FIG. 2 can be optimized for reducing the booting time. The software stack optimization can be regarded as a useful method without adding any hardware. Restriction of using sub-routines and rapper functions in middleware, optimization of a system call and optimization of waiting times for using devices can be the solving points for the software stack optimization. A study for the above points is in progress. However, the software stack optimization is limited because a lot of codes are combined in the software stack and implementations tried by each software stack are clear.

As described above, more than 1 minute booting time is needed in a present technology state despite of the several techniques for reducing the booting time in hardware and software. Therefore, the long booting time should be solved.

Meanwhile, there is under study a method of using a DC-DC converter having an advance line regulation characteristic or a parallel type DC-DC converter to solve the irregular voltage wave and the sudden voltage drop. However, the DC-DC converter is only effective in the voltage variation within tens of milliseconds and it is not effective in the voltage variation within tens of seconds. The telematics terminal should be worked safely and precisely in the voltage variation within not only tens of milliseconds but also tens of seconds.

That is, since the telematics terminal performs embedded programs and contents which are downloaded through wireless communication, it has a complex structure in hardware and software. Therefore, the telematics terminal has a long waiting time for starting its system after powered on. In addition, the telematics terminal has a safety problem in supplying power thereto during its operation since it is installed in a vehicle.

SUMMARY OF THE INVENTION

It is, therefore, an object of the present invention to provide a secondary power supply for a telematics terminal for protecting an inside hardware within the telematics terminal, supplying a stable power into the telematics terminal and reducing a sensible booting time by additionally employing a secondary battery for operating the telematics terminal and a power controller for controlling the secondary battery, and controlling the power of the telematics terminal based on a driving control signal produced by the power controller.

In accordance with an aspect of the present invention, there is provided a secondary power supply for a telematics terminal including a power control unit for controlling a power supply based on a power control signal of the telematics terminal and/or a start-up key signal coupled from the outside, a telematics control unit which is operated by power supplied from a secondary power supply unit under the control of the power control unit and controls each of components inside the telematics terminal, the secondary power supply unit for supplying the power to the telematics control unit, and a rectifying unit for rectifying power from a main power supply unit one more time and protecting the components from a reverse voltage by opening the connection of the main power supply unit and the secondary power supply unit when a voltage level of the secondary power supply unit is higher than that of the main power supply unit.

The present invention can reduce the long booting time which is disadvantage of the conventional telematics terminal and provides a stable uses by resisting a voltage fluctuation during an operation of the telematics terminal.

In addition, the present invention suggests a stable operation of the telematics terminal by additionally employing a secondary battery for supplying a power to the telematics terminal, and controlling the power of the telematics terminal. However, above method can reduce a booting time which is not real booting time but sensible booting time of the telematics terminal.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a secondary power supply for a telematics terminal in accordance with the present invention will be described in detail referring to the accompanying drawings.

Figure 1:
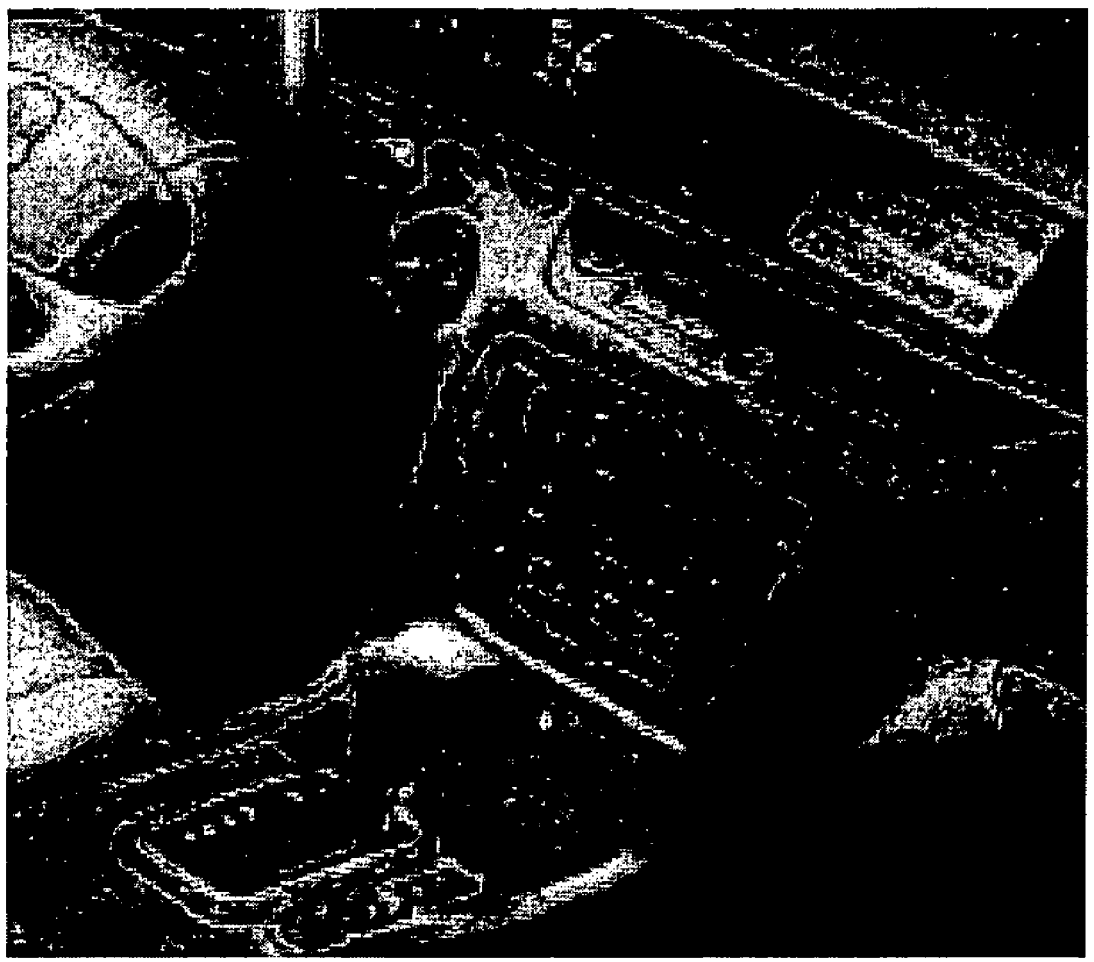
FIG. 1 shows an interior of a vehicle having a telematics terminal installed therein.
Figure 2:
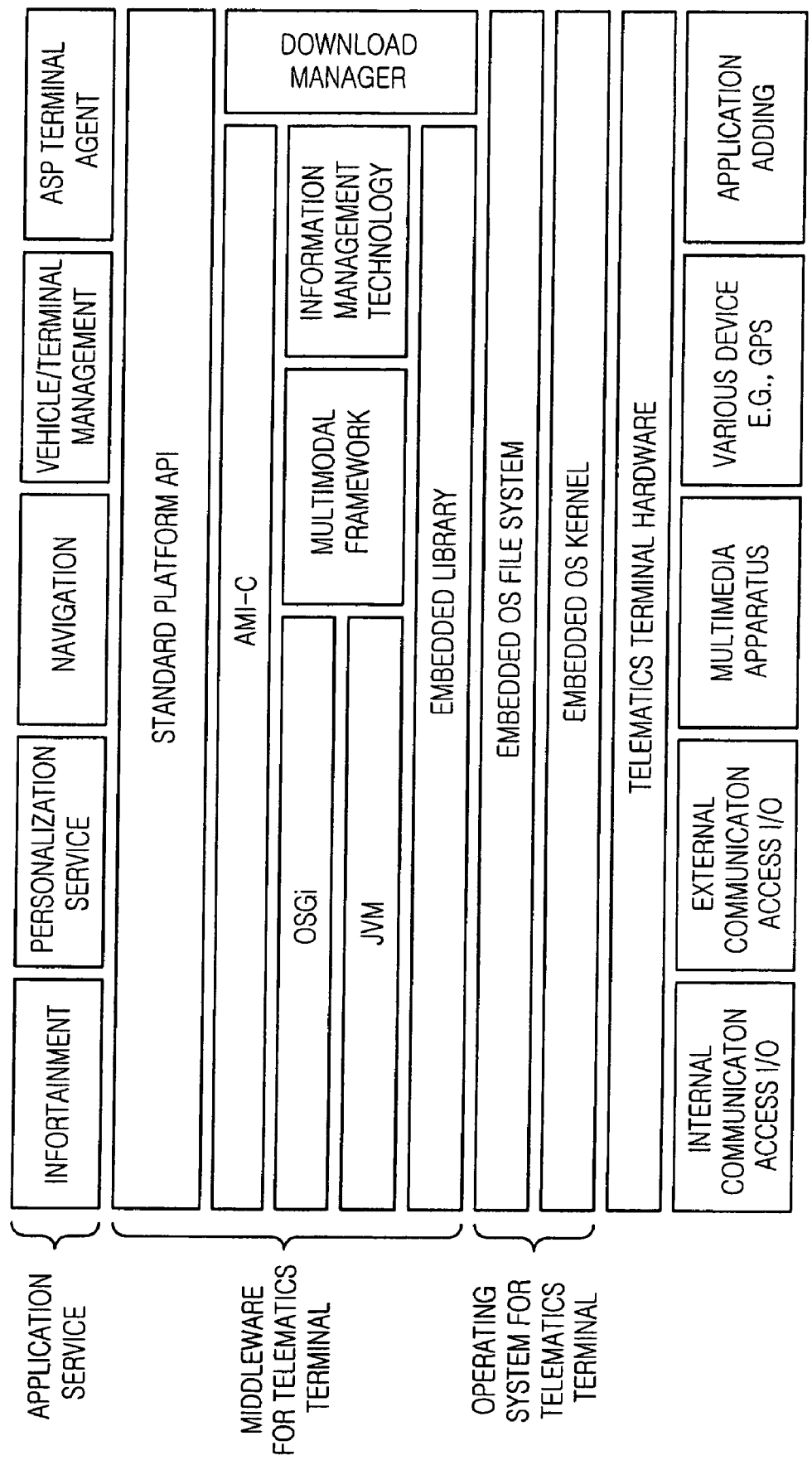
FIG. 2 shows a software stack of the telematics terminal.
Figure 3:
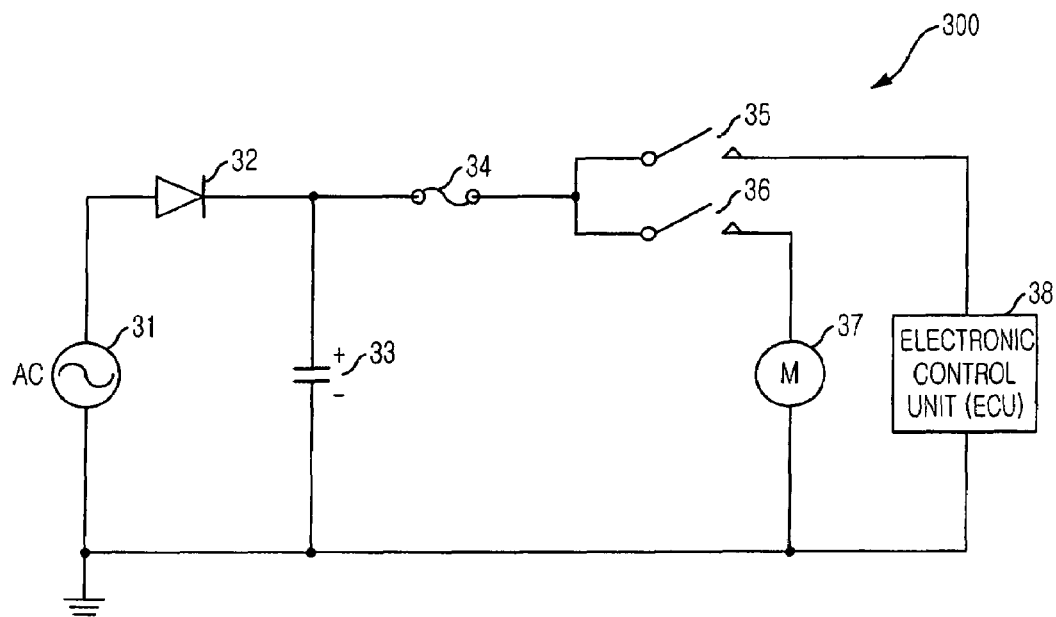
FIG. 3 is a circuit diagram of a conventional electrical unit of the vehicle.

FIG. 3 is a circuit diagram of a conventional electrical unit 300 of a vehicle.

As shown in FIG. 3, the electrical unit 300 includes an alternator 31, a rectifier 32 (for example, a diode), a main battery 33, a fuse 34, a first switch 35, a second switch 36, a motor 37 and an electronic control unit (ECU) 38.

The alternator 31 generates an alternate current (AC) power when an engine of the vehicle is normally working based on a running signal ON of a vehicle start-up key.

The rectifier 32 rectifies the AC power transmitted from the alternator 31 to a direct current (DC) power.

The main battery 33 is charged with the DC power transmitted through the rectifier 32. Herein, a charging step performed in the main battery 33 is the same as that in a general diode rectifying circuit.

The fuse 34 protects internal devices from a power supplied from the main battery 33.

The first switch 35 switches the power transmitted from the main battery 33 to the ECU 38 in response to the running signal ACC and ON.

The second switch 36 switches the power transmitted from the main battery 33 to the motor 37 in response to a start signal (START) of the vehicle start-up key ACC.

The motor 37 is driven by the power transmitted through the second switch 36 which is actually ACC position in key box.

The ECU 38 is driven by the power transmitted through the first switch 35 and controls various electronic equipments in the vehicle.

In case of general vehicles, the main battery maintains a voltage level higher than 12V DC voltage. Accordingly, the 12V DC voltage is used as various supplying voltages for the electronic equipments throughout a distributor, and the ECU 38 controls operations of the electronic equipments.

Figure 4:
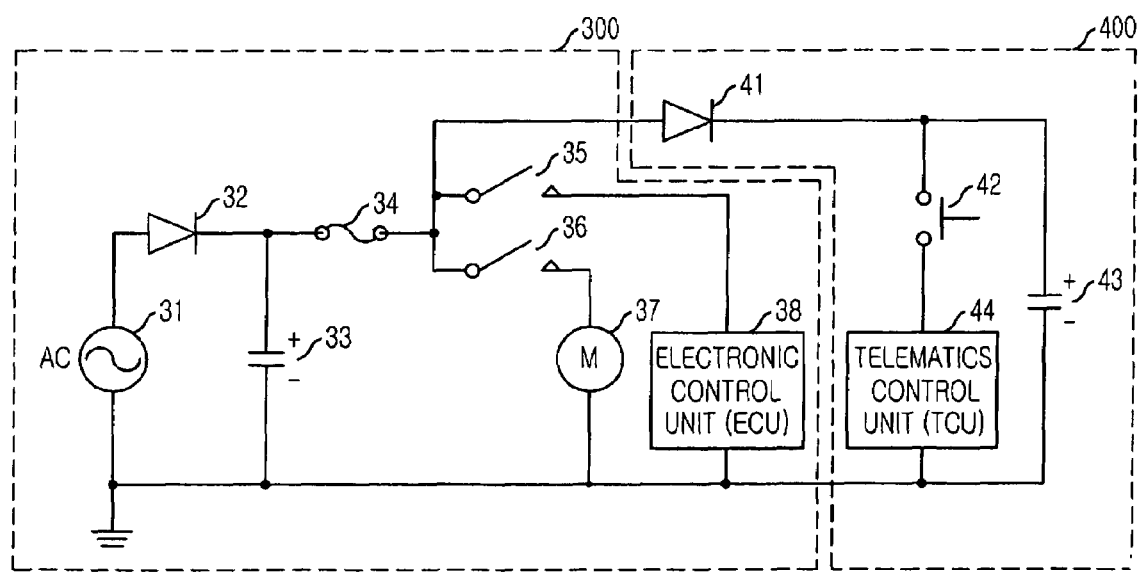
FIG. 4 is a circuit diagram of an electrical unit of the vehicle in accordance with the present invention.

FIG. 4 is a circuit diagram of an electrical unit of the vehicle in accordance with the present invention.

As shown in FIG. 4, the electrical unit of the vehicle in accordance with the present invention includes an alternator 31, a rectifier 32 (for example, a diode), a main battery 33, a fuse 34, a first switch 35, a second switch 36, a motor 37, an electronic control unit (ECU) 38, a diode 41, a secondary battery 43, a telematics control unit (TCU) power switch 42 and a telematics control unit (TCU) 44.

The alternator 31 generates an alternate current (AC) power when an engine of the vehicle is normally working based on a running signal ACC and ON of a vehicle start-up key.

The rectifier 32 rectifies the AC power transmitted from the alternator 31 to a direct current (DC) power.

The main battery 33 is charged with the DC power transmitted through the rectifier 32. Herein, a charging step performed in the main battery 33 is the same as that in a general diode rectifying circuit.

The fuse 34 protects internal devices from a power supplied from the main battery 33.

The first switch 35 switches the power transmitted from the main battery 33 to the ECU 38 in response to the running signal ACC and ON.

The second switch 36 switches the power transmitted from the main battery 33 to the motor 37 in response to a start signal (START) of the vehicle start-up key.

The motor 37 is driven by the power transmitted through the second switch 36.

The ECU 38 is driven by the power transmitted through the first switch 35 and controls various electronic equipments in the vehicle.

The diode 41 rectifies power transmitted from the main battery 33 one more time and protects the components from a reverse voltage by opening the connection the main battery 33 and the secondary battery 43 when a voltage level of the secondary battery 43 is higher than that of the main battery 33.

The secondary battery 43 supplies the power to the TCU 44 separately with the main battery 33.

The TCU power switch 42 is implemented by an output terminal of a relay circuit and supplies the power transmitted from the secondary battery 43 to the TCU 44 based on a power control signal.

The telematics control unit (TCU) 44 operated by the power transmitted from the main battery 33 or the secondary battery 43 when the TCU power switch 42 is turned on.

Herein, the secondary battery 43 is embedded separately with the main battery 33 and supplies a power to the TCU 44 when the TCU power switch 42 is turned on, thereby driving the TCU 44.

Generally, when the vehicle is running, the TCU power switch 42 remains turned on and thus, the TCU 44 is driven by the power supplied from the secondary battery 43.

The secondary battery 43 can be charged by both of the alternator 31 and the main battery 33. Therefore, a stable power can be supplied from the main battery 33 to the secondary battery 43 through the diode 41 even though an output wave of the alternator 31 changes suddenly. As a result, the TCU 44 can be operated in a stable condition.

In addition, even though the main battery 33 is discharged due to carelessness of a user or the termination of battery life, it is possible to drive the TCU 44 by using the secondary battery 43 and, then, generate an SOS emergency signal. Accordingly, it is noted that the telematics terminal is a core equipment for providing safe driving and preparation for, e.g., emergency circumstances.

Herein, although a capacity or a size of the secondary battery is not described in detail, the secondary battery can be any kind of energy storing apparatus and operating like the afore-mentioned secondary battery.

Meanwhile, the TCU power switch 42 is practically implemented by an output terminal of a relay unit 500 which will be described in FIG. 5. That is, the TCU power switch 42 is a same device with relay out 506 in FIG. 5 actually. Herein, a relay is a device activating other devices connected thereto by opening or shutting its electric contact point. The relay can perform its operation by identifying the existence and the size of an electrical input.

Controls for controlling the TCU power switch 42 and related control circuits will be described in detail in FIG. 5.

Figure 5:
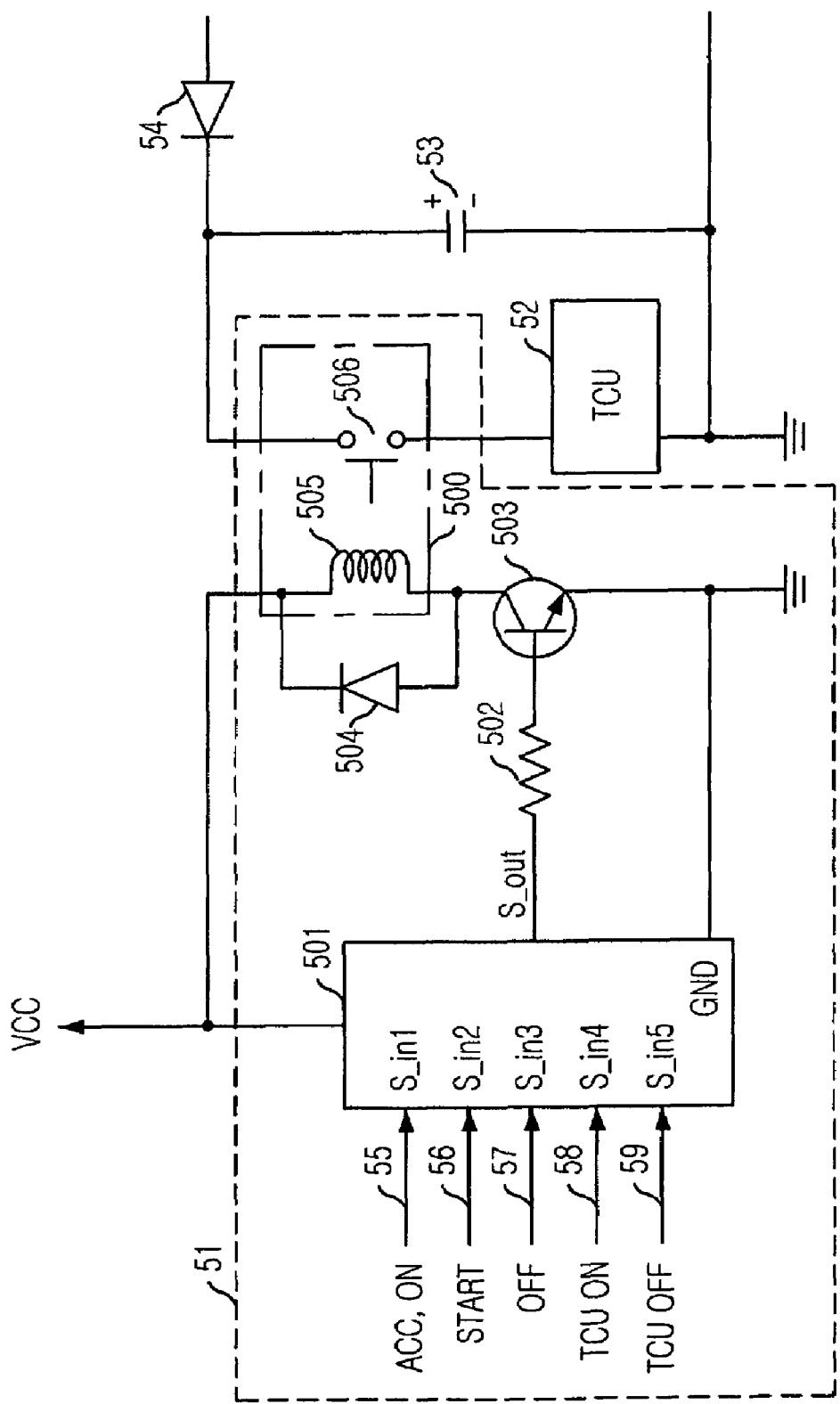
FIG. 5 is a circuit diagram of a secondary power supply for the telematics terminal in accordance with the present invention.

FIG. 5 is a circuit diagram of a secondary power supply for the telematics terminal in accordance with the present invention.

As shown in FIG. 5, a secondary power supply for the telematics terminal includes a TCU power control unit 51, a telematics control unit 52, a secondary battery 53 and a first diode 54.

Where, we have to address that the TCU 44 in FIG. 4 corresponds to the TCU 52 in FIG. 5, the diode 41 in FIG. 4 corresponds to the first diode 54 in FIG. 5, and the secondary battery 43 in FIG. 4 corresponds to the secondary battery 53 in FIG. 5.

The TCU power control unit 51 controls a power supply based on a power control signal of the telematics terminal and/or a stat-up key signal coupled from the outside The telematics control unit (TCU) 52 which is operated by the power supplied from the secondary battery 53 under the control of the TCU power control unit 51 and controls each of components inside the telematics terminal.

The secondary battery 53 supplies the power to the TCU 52.

The first diode 54 rectifies power transmitted from the main battery 33 (not described in FIG. 5) one more time and protects the components from a reverse voltage by opening the connection of the main battery 33 and the secondary battery 53 when a power level of the secondary battery 53 is higher than that of the main battery 33.

Meanwhile, the TCU power control unit 51 includes an driving controller 501 and an driving unit including all devices except the driving controller 501 in the TCU power control unit 51.

The driving controller 501 outputs a driving control signal (S_out) based on a combination result of the start-up key signal and the power control signal of the telematics terminal. Herein, the main battery 33 or the secondary battery 53 supplies a VCC power.

The driving unit drives the TCU 52 in response to the driving control signal (S_out) transmitted from the driving controller 501.

Meanwhile, the driving unit includes a transistor 503, a resistor 502, a relay coil 505, a TCU switch 506 and a second diode 504.

The transistor 503 is turned on in response to the driving control signal transmitted from the driving controller 501 to thereby flows an electrical current to the relay coil 505.

The resistor 502 is located between the driving controller 501 and the transistor 503 and flows the electrical current in order to transmit the driving control signal.

The relay coil 505 turns on the TCU switch 506 by flowing an induced current when the transistor 503 is turned on.

The TCU switch 506 provides power to the telematics control unit (TCU) 52 in response to the induced current of the relay coil 505.

The second diode 504 protects the transistor 503 from a counter electromotive force induced in the relay coil 505 when the TCU switch 506 is turned off.

Here, the driving controller 501 can be practically implemented by using various kind of a microprocessor or a micro controller. The driving controller 501 receives input signals from S_in1 to S_in5, process the input signals as following an equation EQ.1 and outputs the driving control signal through an S_out terminal.

The input signals from S_in1 to S_in5 are described a table 1.

TABLE 1

| Input signal | Description of signal |
| --- | --- |
| S_in1 (ACC, ON) | Running signal of start-up key |
| S_in2 (START) | Start signal of start-up key |
| S_in3 (OFF) | Off signal of start-up key |

TABLE 1-continued

| Input signal | Description of signal |
| --- | --- |
| S_in4 (TCU ON) | Power-on signal of telematics terminal |
| S_in5 (TCU OFF) | Power-off signal of telematics terminal |

That is, S_in1 is a running signal of a start-up key; S_in2 is a start signal of the start-up key; S_in3 is an off signal of the start-up key; S_in4 is a power-on signal of the telematics terminal; S_in5 is a power-off signal of the telematics terminal; and S_out is the driving control signal.

Herein, S_in1, S_in2 and S_in3 are obtained from the start-up key; S_in4 and S_in5 can be obtained from a power push-button switch of the telematics terminal or a remote controller of the telematics terminal.

The driving control signal (S_out) outputted from the driving controller 501 can be expressed as a following equation $$S\_out=((S\_in1+S\_in2)\cdot(\overline{S\_in3})+(S\_in4\cdot\overline{S\_in5})).  \qquad \text{EQ. 1}$$

Herein, when the user turns on the remote controller of the telematics terminal before riding on the vehicle, the TCU power control unit 51 performs booting steps by turning on the telematics control unit 52 according to the equation EQ. 1.

Then, the user rides on the vehicle and performs start-on by inserting the start-up key into a start-up box, and after the start-up of the vehicle is finished, the start-up key is moved to an ON location.

After then, the telematics terminal goes to a stand-by mode to respond of the user after completing the booting steps. The user recognizes that the booting time of the telematics terminal is reduced and uses the telematics terminal at once.

As describe above, the present invention protects an inside hardware of the telematics terminal, supplies a stable power into the telematics terminal and reduces a sensible booting time by adding a secondary battery for operating the telematics terminal and a power controller for controlling the secondary battery, and controlling a power of the telematics terminal based on a driving control signal produced by the power controller.

That is, the present invention can reduce the sensible booting time by processing the booting steps before using the telematics terminal through the remote controller.

In addition, the present invention can resist a voltage fluctuation of the main battery caused by a driving state of the vehicle, an electric field and a state of the main battery. Particularly, the present invention can resist the voltage fluctuation of the vehicle having a manual transmission and a sudden voltage drop of the main battery caused by unskillfulness of a driver.

Finally, the present invention protects internal circuits of the telematics terminal and provides the user with a stabilized system without a sudden system-down.

The present application contains subject matter related to Korean patent application No. 2004-0105130, filed with the Korean Patent Office on Dec. 13, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A secondary power supply for a telematics terminal, comprising: a power control unit for controlling a power supply based on a power control signal of the telematics terminal and/or a start-up key signal coupled from the outside;
- a telematics control unit which is operated by power supplied from a secondary power supply unit under the control of the power control unit and controls each of components inside the telematics terminal;
- the secondary power supply unit for supplying the power to the telematics control unit; and
- a rectifying unit for rectifying power from a main power supply unit one more time and protecting the components from a reverse voltage by opening the connection of the main power supply unit and the secondary power supply unit when a voltage level of the secondary power supply unit is higher than that of the main power supply units,
- wherein the power control unit includes:
- a driving control sector for outputting a driving control signal based on a combination result of the start-up key signal and the power control signal; and
- a driving sector for driving the telematics control unit in response to the driving control signal from the driving control sector,
- wherein the driving sector has:
- a transistor being turned on in response to the driving control signal to thereby flow an electrical current to a relay coil;
- a resistor, located between the driving control sector and the transistor, for flowing the electrical current in order to transmit the driving control signal;
- the relay coil for turning on a switch by flowing an induced current when the transistor is turned on;
- the switch for providing power to the telematics control unit in response to the induced current of the relay coil; and
- a diode for protecting the transistor from a counter electromotive force induced in the relay coil when the switch is turned off.

2. The secondary power supply as recited in claim 1, wherein the driving control signal outputted from the driving control sector is produced as follows, $$S\_out = ((S\_in1 + S\_in2) \cdot (\overline{S\_in3}) + (S\_in4 \cdot \overline{S\_in5})),$$

wherein $S\_in1$ is a running signal of a start-up key; $S\_in2$ is a start signal of the start-up key; $S\_in3$ is an off signal of the start-up key; $S\_in4$ is a power-on signal of the telematics terminal; $S\_in5$ is a power-off signal of the telematics terminal; and $S\_out$ is the driving control signal.

* * * * *